Figure 1:
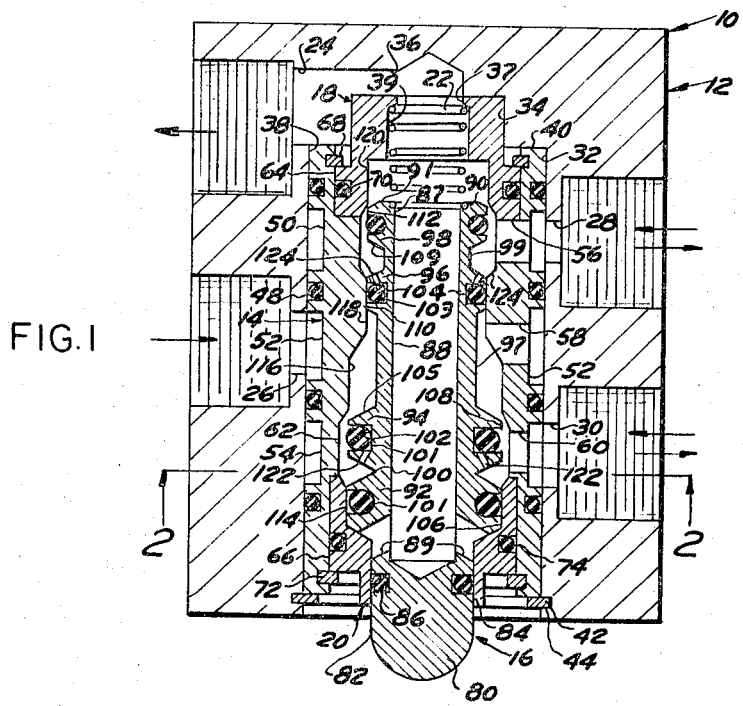

May 9, 1967 O. H. McCOLLUM ET AL 3,318,333

PRESSURE-SEALED PISTON-AND-CYLINDER ASSEMBLY

Filed Jan. 28, 1965

INVENTORS
ORLA H. McCOLLUM
PAUL L. McCOLLUM
BY

*Barthel & Bugbee*

ATTORNEYS

United States Patent Office 3,318,333
Patented May 9, 1967

3,318,333
PRESSURE-SEALED PISTON-AND-CYLINDER ASSEMBLY
Orla H. McCollum and Paul L. McCollum, Novi, Mich., assignors to Novi Tool and Machine Company, Novi, Mich., a corporation of Michigan
Filed Jan. 28, 1965, Ser. No. 428,715
2 Claims. (Cl. 137—625.69)

This invention relates to fluid pressure seals and, in particular, to such seals for reciprocating pistons or plungers.

Hitherto, the sealing of a reciprocable piston and cylinder such as are used in a reciprocating piston valve has been very unsatisfactory because of the fact that the pressure fluid works its way into the bottom of the O-ring groove in which the O-ring or other sealing ring is seated and expands the sealing ring outwardly out of its groove and against the ordinarily sharp edges between an enlargement of the cylinder bore and the cylinder bore as the piston valve head move therebetween, chewing up the sealing ring and thereby breaking the seal and rendering the machine useless. Prior attempts have been made to prevent this bursting out and subsequent cutting up of sealing rings by providing rings with annular flanges on their opposite sides fitting into undercut grooves in the piston or plunger. Such expedients, however, have brought in the further disadvantage of necessitating such pistons or plungers to be constructed in multiple sections in order to assemble the sealing rings within the undercut grooves, thereby adding greatly to the cost and complexity of manufacture and accordingly greatly increasing the cost of purchase and upkeep to the user. The present invention eliminates these defects and disadvantages and still enables the use of ordinary O-rings as sealing rings in ordinary grooves by providing the piston or plunger with pressure relief ports leading from the bottoms of the sealing ring grooves on the inner sides of the sealing rings directly to the low pressure space beyond the low-pressure face of the piston or plunger, thereby directly and effectively venting to the low pressure side of the fluid circuit the pressure fluid which has infiltrated into the bottoms of the sealing ring grooves and which otherwise would expand the sealing rings outward and cause their disintegration.

Accordingly, one object of this invention is to provide an improved pressure-sealed fluid pressure piston and cylinder assembly having a sealing ring, such as an O-ring, in an annular groove in the periphery of the piston and having a pressure relief vent extending from the bottom of the sealing ring groove to the low pressure face of the piston or plunger, thereby preventing the outward expansion and consequent damage or destruction of the sealing ring and also enabling the valve piston or plunger to be made in one piece rather than in multiple sections, as in the above-mentioned prior constructions.

Another object is to provide an improved pressure-sealed piston and cylinder assembly of the foregoing character, wherein the one-piece plunger construction thus provided according to the invention enables the piston or plunger to be retained within the bore in which it reciprocates by means of a snap ring or the like, thereby further simplifying the construction of the machine.

Figure 2:
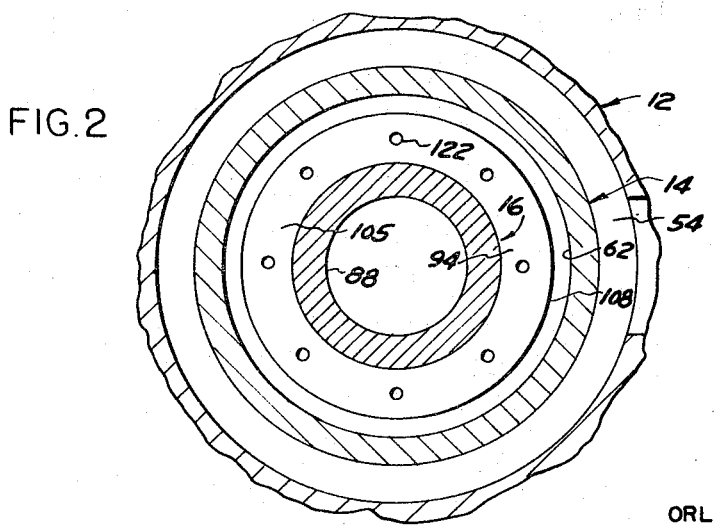

Other objects and advantages of the invention will become apparent during the course of the following description of the accompanying drawing, wherein:

FIGURE 1 is a central vertical section through a pressure fluid piston valve with a reciprocable plunger, specifically a four-way piston valve, employing the improved sealing arrangement according to the present invention; and FIGURE 2 is a horizontal section, upon an enlarged scale, looking upward in the direction of the arrows along the line 2—2 in FIGURE 1.

Referring to the drawing in detail, FIGURES 1 and 2 show a pressure fluid piston valve, generally designated 10, shown by way of exemplification but not limitation as a four-way piston valve but also applicable to a three-way valve, and equipped with the improved sealing arrangement according to the present invention. The piston valve 10 consists generally of a ported valve casing or block 12 bored to receive a ported stationary valve sleeve or valve cylinder 14. Mounted for reciprocation within the valve sleeve 14 is a valve plunger or piston 16 which is guided in its reciprocation by inner and outer annular caps or collars 18 and 20 respectively. The inner cap 18 contains a compression valve plunger return spring 22 urging the valve plunger 16 in an outward or downward direction.

The valve casing or valve block 12, as its name indicates, is constructed, for convenience, in the form of a block of any suitable shape, such as cylindrical or rectangular, as the mounting conditions indicate, and is provided on one side with a pair of transversely-disposed, counterbored and threaded exhaust and pressure intake ports 24 and 26 respectively spaced axially apart from one another. The opposite side of the valve block 12 is provided with a pair of transversely-disposed, counterbored and threaded service ports 28 and 30 respectively spaced axially apart from one another and also spaced axially away from the exhaust and pressure intake ports 24 and 26 respectively. The ports 24, 26, 28, and 30 open into a longitudinal bore 32 in the valve block 12 terminating at its inner end in a counterbore 34. The exhaust port 24 has an extension passageway 36 leading into the valve block 12 to a location immediately behind the counterbore 34, and communicating with a port 37 leading into a counterbore 39 within the inner cap 18. The counterbore 39 receives the inner portion of the return spring 22.

The valve sleeve or valve cylinder 14 has a cylindrical outer surface 38 which snugly fits the bore 32 in the valve block 12 and which at its inner end abuts the annular end or bottom surface 40 between the bore 32 and counterbore 34. At its outer end, the valve sleeve or cylinder 14 is retained in position by a snap ring 42 mounted within an internal annular groove 44 at the mouth of the bore 32. The sleeve 14 is also externally grooved at intervals spaced apart from one another adjacent the ports 24, 26, 28 and 30 to receive O-rings 48 for preventing leakage of pressure fluid between the bore 32 and the external surface 38 of the sleeve 14. The sleeve 14 is also provided with wide axially-spaced annular external channels 50, 52 and 54 which register and communicate with the valve ports 28, 26 and 30 respectively, and also with sleeve ports 56, 58 and 60. The sleeve ports 56 and 60 register with the valve blocks ports 28 and 30 respectively, whereas the sleeve port 58 leads from the annular channel 52 registering with the pressure fluid intake port 26 into the sleeve bore 62. At its opposite ends, the sleeve bore 62 opens into inner and outer counterbores 64 and 66. The inner annular cap 18 at its inner end fits into the valve block counterbore 34 and its outer end fits into the inner sleeve counterbore 64, the sleeve 14 at its inner end being internally grooved to receive a retaining snap ring 68 which holds the inner cap 18 in position. The enlarged outer end of the inner cap 18 is grooved to receive an O-ring 70, and is also internally flanged at its inner end to serve as an abutment for the return spring 22. The annular outer cap 20 is similarly seated at its inner end in the sleeve counterbore 66, which is internally grooved at its outer end to receive a retaining ring 72. The outer cap 20 is also externally grooved to receive an O-ring 74.

The valve sleeve bore 62 is of roughly stepped configuration so that it varies in internal diameter at different locations from end to end, according to the corresponding external diameters of the various portions of the valve plunger or piston 16 as described more fully below. The outer end of the valve plunger 16 is provided with a rounded contact end portion 80 terminating in a small diameter cylindrical portion 82 which fits snugly but slidably into the bore 84 of the outer annular cap 20, and is externally grooved to receive an O-ring 86 to provide a seal therebetween. The valve plunger 16 is also provided with a central longitudinal bore 88 which extends from its open inner end 87 to a plurality of outwardly-inclined ports 89 opening into the sleeve bore 62 adjacent the outer end portion 80 of the valve plunger 16. The inner end 87 of the longitudinal bore 88 is provided with a small counterbore 90 to receive the outer end of the plunger return spring 22 adjacent the inner end 91 of the valve plunger 16.

The valve plunger 16 is provided near its outer end portion 80 with a pair of axially-spaced large-diameter piston heads 92 and 94 separated axially from a pair of axially-spaced small diameter piston heads 96 and 98 near the inner end 91 of the plunger 16 by a wide annular channel 97. The large piston heads 92 and 94 are separated from one another by an annular groove 100 of V-shaped cross-section, whereas the small piston heads 96 and 98 are similarly separated from one another by an annular groove 99 of truncated V-shaped cross-section. Each of the large piston heads 92 and 94 is provided with an annular circumferential O-ring groove 101 in which is mounted a large O-ring 102. In a similar manner, each of the small piston heads 96 and 98 is provided with a smaller annular circumferential O-ring groove 103 in which is mounted a small O-ring 104. The large piston heads 92 and 94 have tapered opposite faces 105 and large diameter cylindrical side surfaces 106 and 108 adapted to snugly but slidably fit corresponding internal cylindrical surfaces 114 and 116 in the outer end cap 20 and valve sleeve 14 respectively. The small pistons 96 and 98 similarly have tapered opposite faces 109 and small diameter cylindrical side surfaces 110 and 112 snugly but slidably fitting corresponding internal cylindrical surfaces 118 and 120 in the valve sleeve 14 and inner end cap 18 respectively. These external cylindrical surfaces of the valve piston head and internal cylindrical surfaces of the end caps 18 and 20 and valve sleeve 14 are selectively and successively engageable as a result of moving the valve plunger 16 in an axial direction.

In order to prevent outward expansion and consequent shredding of the O-ring 102 by pressure fluid reaching the bottom of its O-ring groove 101 in the valve piston head 94 as the latter moves into the smaller diameter bore portion 116, the head 94 on its lower pressure face adjacent the annular groove 100 is provided with a multiplicity of vents or pressure fluid relief ports or passageways 122 extending outwardly from the bottom of the groove 101 of the O-ring 102 to the annular groove 100 lying within an enlargement of the bore 62 outside the bore portion 116. Similarly, the O-ring groove 103 in the valve piston head 96 containing the O-ring 104 is provided on its low pressure face adjacent the valve piston head 98 with a multiplicity of vents or pressure relief ports or passageways 124 extending outwardly from the bottom of the O-ring groove 103 containing the O-ring 104 to the annular groove 99 between the smaller piston heads 96 and 98 and lying within another enlargement of the bore 62 outside the bore portion 118.

In the operation of the invention, let it be assumed that the working parts of the valve 10 are in the positions shown in FIGURE 1 and that the threaded fluid pressure intake port 26 has been connected to a source of pressure fluid, such as compressed air or hydraulic pressure fluid, and the threaded exhaust port 38 connected to a suitable place of disposal for the pressure fluid exhausted, such as the open air for compressed air or a reservoir for hydraulic fluid. Pressure fluid will thus flow in the direction of the arrow into the intake port 26 and outward from the exhaust port 38, and in either direction as indicated by the half arrows, into or out of the service ports 28 and 30, it being understood that when pressure fluid is flowing out of one of the service ports 28 and 30 it is flowing into the other service port, depending upon the position of the valve plunger 16.

In the outer or downward position of the valve plunger 16 in FIGURE 1, as urged by the return spring 22, pressure fluid flows from the intake port 26 into and around the annular channel 52 in the ported valve sleeve 14 and thence through the port 58 and the intermediate annular valve plunger channel 97 outward through the sleeve port 60 and service port 30 to the place of utilization, such as, for example, to operate an air cylinder or hydraulic cylinder, as the case may be. In the same position of the valve plunger 16 and at the same time, pressure fluid flows inward from the place of utilization through the service port 28 and sleeve port 56, thence along the sleeve bore 62 past the valve plunger head 98 into the counterbore 120 and bore 39 of the annular inner cap 18 and thence through the end port 37 and passageway 36 outward through the exhaust port 24 to the place of fluid disposal, such as to the open air for compressed gas or to a reservoir or tank for hydraulic fluid.

While this is occurring, any pressure fluid escaping along the clearance between the sleeve bore portion 118 and the head surface 110 of the piston head 96 into the O-ring groove 103 of the O-ring 104 is immediately vented through the multiple vent or pressure relief ports 124 into the annular groove 99 and thence is exhausted in the manner previously described for the fluid passing through the service port 28 and sleeve port 56 to the exhaust port 24. The vent or pressure relief ports 122 in the valve head 94 at this time remain inactive because the O-ring 102 at this time is subjected to the same pressure of pressure fluid on both sides of the valve head 94. Thus, the O-ring 104 is prevented at this time from being expanded outward by pressure fluid leaking into its groove 103, as has occurred heretofore, and consequently the O-ring 104 remains undamaged.

If, now, the valve 10 is reversed by applying force to the end 80 of the valve plunger 16 sufficient to overcome the thrust of the return spring 22 and shift the valve plunger 16 to its innermost or uppermost position, opposite to that shown in FIGURE 1, the small valve head 98 moves upward into sealing engagement with the counterbore 120 so that the inner end 91 of the valve plunger engages the end of the counterbore 120 as a stop. At the same time, the small valve head 96 moves upward to establish communication between the wide intermediate annular channel 97 in the valve plunger 16 and sleeve port 56 and service port 28. Pressure fluid now passes from the intake port 26 around the annular sleeve channel 52, through the sleeve port 58 and along the wide annular valve plunger channel 97 through the sleeve port 56 and service port 28 outward to the place of utilization of the pressure fluid, such as a pneumatic or hydraulic cylinder. At the same time, the fluid discharged from the place of utilization passes inward through the service port 30 and sleeve port 60 into and along the counterbore 114 of the outer annular cap 20 past the now upwardly-shifted valve piston head 92 and through the inclined ports 89, whence it flows into and through the central longitudinal valve plunger bore 88 and out its open end 87, thence through the counterbore 39 and end port 37 in the inner cap 18 into the passageway 36 and thence outward through the exhaust port 24 to a place of disposal, such as to the open air in the case of compressed air, or to a hydraulic fluid reservoir in the case of hydraulic pressure fluid.

While this action is occurring, any pressure fluid escaping past the valve piston head 94 and the sleeve bore portion 116 into the annular O-ring groove 101 of the O-ring 102 is immediately vented through the multiple vent or pressure relief ports 122 into the annular groove 100 and thence to the exhaust ports 89 past the now-raised valve piston head 92. In this manner, the O-ring 102 is prevented from being expanded outward and consequently damaged.

In the foregoing way, therefore, and according to the invention, the multiple vent ports 122 and 124 release leakage pressure fluid from their respective O-ring grooves 101 and 103 respectively into the low-pressure or exhaust side of the system before such leakage pressure fluid is able to expand the respective O-rings outward and cause them to be chewed up and consequently damaged or destroyed as has hitherto occurred in the manner described above. At the same time, the present invention by enabling the successful use of ordinary O-rings, makes it possible to construct the valve plunger and its piston heads in one piece, instead of in multiple sections required in prior valve plungers using special flanged O-rings.

What we claim is:

1. A pressure-sealed piston valve assembly, comprising a piston valve cylinder structure having an axial bore therein with enlargements adjacent thereto and having axially-spaced pressure fluid intake, fluid exhaust and fluid service ports communicating with said bore at intervals therealong;

a piston valve plunger reciprocably mounted in said bore and having a plurality of axially-spaced enlarged piston valve heads thereon slidably engaging said bore and movable between said bore and said enlargements, said piston valve heads having annular circumferential sealing ring grooves therein;

each piston valve head during operation having one face exposed to high pressure fluid within a high pressure fluid space and an opposite face exposed to low pressure fluid within a low pressure fluid space;

each piston valve head having a pressure fluid relief passageway extending from its respective sealing ring groove to its respective opposite face;

said piston valve plunger having a longitudinal passageway therethrough communicating directly and continuously with said fluid exhaust port;

said piston valve plunger having a lateral port extending transversely outward from said longitudinal passageway and placed in communication with said low pressure fluid space in response to the reciprocation of said valve plunger;

and a sealing ring of resilient material mounted in each groove in sealing engagement with said bore;

each said passageway extending through its respective piston valve head from a location on the inner side of its respective sealing ring directly to the low pressure space adjoining its respective opposite face.

2. A pressure-sealed piston valve assembly, according to claim 1, wherein each of said piston valve heads has a side wall extending from its respective groove to its respective opposite face and wherein each pressure fluid relief passageway extends from said location on the inner side of its respective sealing ring within its respective sealing ring groove through its respective side wall directly to its respective opposite face.

References Cited by the Examiner

UNITED STATES PATENTS

| 2,542,390 | 2/1951 | Brown | 137—625.48 |
| 2,899,939 | 8/1959 | Norris | 137—625.69 |
| 3,191,626 | 6/1965 | Leibfritz | 137—625.48 |

FOREIGN PATENTS

| 569,932 | 2/1959 | Canada. |

M. CARY NELSON, *Primary Examiner.*

W. JOHNSON, *Assistant Examiner.*